May 29, 1956  C. N. BUNDS, JR  2,748,372
STALL WARNING DEVICE
Filed Oct. 16, 1953
Fig. 1
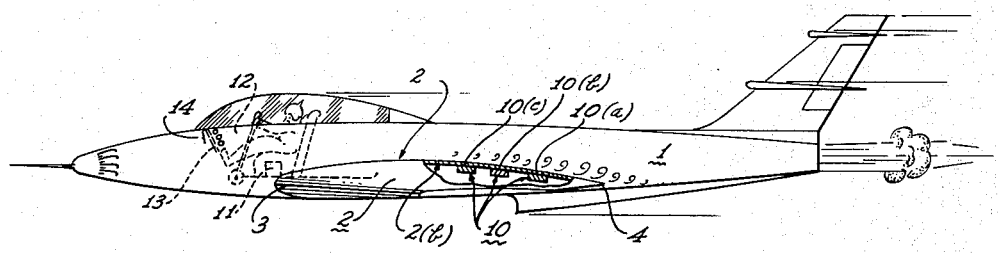
Fig. 2
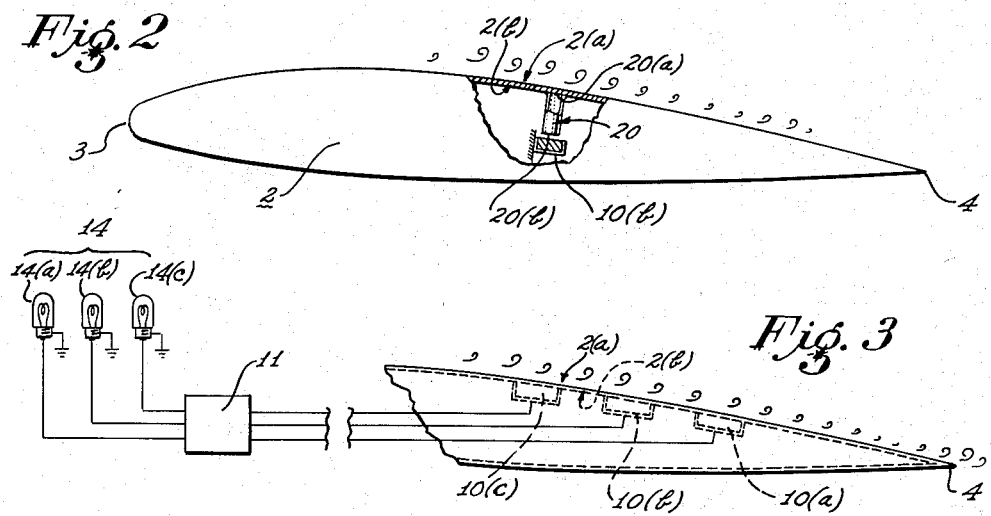
Fig. 3
Fig. 4
INVENTOR:
Charles N. Bunds, Jr.
By Hubert E. Metcalf
His Patent Attorney

United States Patent Office
2,748,372
Patented May 29, 1956

2,748,372
STALL WARNING DEVICE

Charles N. Bunds, Jr., Compton, Calif., assignor to Northrop Aircraft, Inc., Hawthorne, Calif., a corporation of California Application October 16, 1953, Serial No. 386,515

4 Claims. (Cl. 340—27)

My invention relates to the field of airplanes and more particularly to a novel stall warning indicator for airplanes.

With each succeeding year the pilot's dash board becomes more and more congested with dial indicators. During certain maneuvers such as high speed bank turns, landings and the like, the pilot may become too preoccupied to notice an on-coming stall condition until he is already in one. Accidents due to stalls are not uncommon and there has been a constant attempt to provide a satisfactory stall indicator.

Under normal conditions of flight, the air flow over the wing surface is laminar with a small amount of turbulence in the vicinity of the trailing edge. As the angle of attack increases so does the turbulence, which progressively moves forward on the wing surface from trailing toward leading edge. Since little if any lift is obtained from the turbulent air flow, a point along the wing is reached where the lift is inadequate to support the plane and it drops, in other words stalls. Near the ground this is especially dangerous.

My invention proposes the utilization of the sound emitted by the turbulent air flow over the wing surface as a means of indicating an approaching stall. In the design of planes the aerodyamicist can determine the points on the wing surface at which the plane is just beginning its stall and that point at which the stall is complete. This knowledge is obtained and used in placing the means for indicating an incipient stall condition and a full stall.

It is, therefore, a general object of my invention to provide a simple, inexpensive and efficient stall warning indicator.

A further object of my invention is to provide a stall warning indicator responsive only to sound waves emitted from turbulent air flow over the wing surface exterior.

Other objects and uses will manifest themselves to those skilled in the art in view of the subsequent disclosure and drawings wherein:

Figure 1 is a side elevation of an airplane showing the relative position of the component parts of my invention.

Figure 2 is an end view of the wing with a portion thereof broken away to illustrate the use of a hollow tube for transmitting sound waves to the microphone button when said button cannot be placed closely adjacent the upper wing surface interior.

Figure 3 is a schematic drawing of my invention illustrating the preferred elements.

Figure 4 is a schematic drawing of a modified version of my invention in which a head set is the stall warning indicator means.

For a detailed description of my invention, reference is had to the drawings. An aircraft 1 to which the stall warning indicator is to be attached is formed with a wing 2 having a leading edge 3 and a trailing edge 4. The upper wing skin 2(a) is utilized as a signal producing member and electrical pickups 10 such as carbon microphone buttons for example are positioned within the wing structure 2 closely adjacent to the upper wing surface interior 2(b), and directly responsive to vibrations of the wing skin 2(a) due to turbulent air flow thereover. Three buttons 10 can be used, the first button 10(a) being placed in the vicinity of the trailing edge 4 where, even during the course of normal flight, a small amount of air flow turbulence is experienced and consequently sound waves emitted. The second button 10(b) is positioned at a point where an increased turbulence on the wing surface 2(a) would cause sufficient loss of "lift" to approach a stall, hereinafter referred to as the incipient stall point. The third button 10(c) is placed at a point where the turbulence over the wing surface 2(a) would cause a complete stall of the aircraft 1 as contradistinguished from the position of the second button 10(b), where the stall would just begin to affect the aircraft 1. The three buttons 10(a), 10(b) and 10(c), are electrically connected to an amplifier 11 which may, for convenience, be placed in the cockpit 12 of the plane 1. Secured to the dash panel 13 are three lights 14, preferably with different colored bulbs which are electrically connected to the amplifier 11.

Where it is felt that an audio, rather than a visual, stall warning indicator is desirable, a pair of earphones 15, such as those used by the pilot, may be connected to the amplifier 11. The three carbon microphone buttons 10(a), 10(b) and 10(c) may be kept in their former position with respect to the wing surface 2(b) and the pilot will then be warned of an approaching stall by virtue of an increase in sound intensity. An alternative method would be to remove the first and third microphone buttons 10(a) and 10(c) and retain only the second button 10(b), that is the one positioned within the wing 2 at a point with respect to the wing surface exterior 2(a) where the loss in "lift" begins to cause the plane 1 to go into a stall.

In either the visual or audio type stall warning indicator, if for structural reasons the microphone button 10(b) cannot be placed as shown in Figure 1, a hollow tube 20 may be utilized as shown in Figure 2. One end of the tube 20(a) is held closely adjacent or abutting the underneath surface of the upper wing skin 2a of the wing 2 and the other end 20(b) is positioned sufficiently close to a microphone button 10(b) to transmit the sound waves which are flowing through the tube 20 to the microphone button 10(b), thereby providing an indirect coupling to the wing skin 2(a).

The operation of my invention follows. Sound waves will impinge that portion of the wing surface 2(a) over which turbulent air is flowing. These sound waves are transmitted to the electrical pickup such as the carbon microphone buttons 10(a), (b), and (c) through the medium of a signal producing member which may be the wing 2 itself or the combination of the wing 2 and the hollow tube 20. The microphone buttons 10 convert the sound waves to electrical waves which are then transmitted to the cockpit 12 and there amplified by the amplifier 11. In the visual indicator, the first light 14(a) will go on when there is turbulent air passing over that portion of the wing surface exterior 2(a) under which the initial button 10(a) is located. The second light 14(b) which is, in reality, the safety warning indicator, goes on when the turbulent air passes over that portion of the wing surface exterior 2(a) where an incipient stall is occasioned and hence where the second microphone button 10(b) is positioned as determined from aerodynamic calculations. The third light 14(c) goes on when the turbulence of the air flow has reached that portion of the wing surface 2(a) which causes the plane to go into a total stall.

The audio indicator warning is similar to the visual one with the exception that an audio tone reproducer 15 such as a pair of earphones is used to convert the amplified electrical waves into sound waves. Where the three carbon microphone buttons 10 are used, the sound heard by the pilot will increase in intensity as the turbulent air flow moves up the wing surface exterior 2(a) over the position of each microphone button. If only the second button 10(b) is used, then, in normal flight, there will be only laminar air flow over the wing surface 2(a) directly above the button 10(b). At the incipient stall condition, i. e., when a stall is just beginning, the turbulent air flow over that portion of the wing surface exterior 2(a) will transmit sound waves to the button 10(b) positioned within the wing 2. These sound waves will be converted by the carbon microphone button 10(b) into electrical waves and amplified by the amplifier 11. The earphones 15 will then convert the amplified electrical waves into sound waves which will produce an audible signal to the pilot, thus warning him of the impending stall.

It will be noted that nothing need project above the upper surface of the wing, and that there is no interference with the normal airflow thereover.

While in order to comply with the statute, the invention has been described in language more or less specific as to structural features, it is to be understood that the invention is not limited to the specific features shown, but that the means and construction herein disclosed comprise a preferred form of putting the invention into effect, and the invention is therefore claimed in any of its forms or modifications within the legitimate and valid scope of the appended claims.

What is claimed is:

1. A stall warning indicator for an aircraft having upper and lower skin sheets and a leading and trailing edge, electrical pickup means enclosed wholly within said wing and coupled with the under surface of said upper skin to respond to turbulent flow vibration of said skin as air flows thereover in flight, and an indicator responsive to the output of said electrical pickup means.

2. A stall warning indicator for an aircraft having upper and lower skin sheets and a leading and trailing edge, electrical pickup means enclosed wholly within said wing and indirectly coupled with the under surface of said upper skin to respond to turbulent flow vibration of said skin as air flows thereover in flight, and an indicator responsive to the output of said electrical pickup means.

3. A stall warning indicator for an aircraft having upper and lower skin sheets and a leading and trailing edge, electrical pickup means enclosed wholly within said wing and directly coupled with the under surface of said upper skin to respond to turbulent flow vibration of said skin as air flows thereover in flight, and an indicator responsive to the output of said electrical pickup means.

4. A stall warning indicator for an aircraft having upper and lower skin sheets and a leading and trailing edge, electrical pickup means enclosed entirely within said wing and coupled with the under surface of said upper skin to respond to vibration thereof produced by the movement of turbulent air flow thereover in flight, and an indicator responsive to the output of said electrical pickup means to give an indication to the pilot of said aircraft to said turbulent flow condition.

References Cited in the file of this patent
UNITED STATES PATENTS

| | | |
|---|---|---|
| 2,051,827 | De Florez | Aug. 25, 1936 |
| 2,373,089 | Allen et al. | Apr. 10, 1945 |
| 2,519,015 | Bensen | Aug. 15, 1950 |
| 2,611,810 | Greene | Sept. 23, 1952 |